US010073635B2

(12) United States Patent
Willcock et al.

(10) Patent No.: US 10,073,635 B2
(45) Date of Patent: Sep. 11, 2018

(54) MULTIPLE ENDIANNESS COMPATIBILITY

(71) Applicant: Micron Technology, Inc., Boise, ID (US)

(72) Inventors: Jeremiah J. Willcock, Boise, ID (US); Kyle B. Wheeler, Meridian, ID (US); Timothy P. Finkbeiner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 471 days.

(21) Appl. No.: 14/955,680

(22) Filed: Dec. 1, 2015

(65) Prior Publication Data

US 2016/0154596 A1    Jun. 2, 2016

Related U.S. Application Data

(60) Provisional application No. 62/085,999, filed on Dec. 1, 2014.

(51) Int. Cl.
*G06F 3/06*        (2006.01)
(52) U.S. Cl.
CPC .......... *G06F 3/0619* (2013.01); *G06F 3/0665* (2013.01); *G06F 3/0689* (2013.01)
(58) Field of Classification Search
CPC ..... G06F 3/0619; G06F 3/0665; G06F 3/0689
See application file for complete search history.

(56) References Cited

U.S. PATENT DOCUMENTS 4,380,046 A   4/1983   Fung
4,435,792 A   3/1984   Bechtolsheim
(Continued)

FOREIGN PATENT DOCUMENTS

CN       102141905       8/2011
EP       D214718         3/1987
(Continued)

OTHER PUBLICATIONS

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.
(Continued)

*Primary Examiner* — Ramon A Mercado
(74) *Attorney, Agent, or Firm* — Brooks, Cameron & Huebsch, PLLC

(57) ABSTRACT

Examples of the present disclosure provide apparatuses and methods for multiple endianness compatibility. An example method comprises receiving a plurality of bytes and determining a particular endianness format of the plurality of bytes. The method can include, responsive to determining the particular endianness format is a first endianness format, reordering bits of each byte of the plurality of bytes on a bytewise basis, storing the reordered plurality of bytes in an array of memory cells, and adjusting a shift direction associated with performing a number of operations on the plurality of bytes stored in the array. The method can include, responsive to determining the particular endianness format is a second endianness format, storing the plurality of bytes in the array without reordering bits of the plurality of bytes.

29 Claims, 5 Drawing Sheets

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,029,069 A * | 7/1991 | Sakamura ............. G06F 9/3001 708/525 |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Gamey |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shinano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |

(56) References Cited

U.S. PATENT DOCUMENTS

| | | |
|---|---|---|
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0249032 A1* | 10/2009 | Nishihara .............. G06F 5/015 712/204 |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134226 A1 | 5/2012 | Chow |
| 2012/0135225 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0029798 A1 | 1/2015 | Manning |
| 2015/0042380 A1 | 2/2015 | Manning |
| 2015/0063052 A1 | 3/2015 | Manning |
| 2015/0078108 A1 | 3/2015 | Cowles et al. |
| 2015/0279466 A1 | 3/2015 | Manning |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0324290 A1 | 11/2015 | Leidel |
| 2015/0325272 A1 | 11/2015 | Murphy |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 A1 | 5/2013 |
| WO | 2013081588 | 6/2013 |
| WO | 2013095592 | 6/2013 |

OTHER PUBLICATIONS

Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

(56) References Cited

OTHER PUBLICATIONS

Boyd et al., "On the General Applicability of Instruction-Set Randomization", Jul.-Sep. 2010, (14 pgs.), vol. 7, Issue 3, IEEE Transactions on Dependable and Secure Computing.
Stojmenovic, "Multiplicative Circulant Networks Topological Properties and Communication Algorithms", (25 pgs.), Discrete Applied Mathematics 77 (1997) 281-305.
"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.
Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.
Debnath, Biplob, Bloomflash: Bloom Filter on Flash-Based Storage, 2011 31st Annual Conference on Distributed Computing Systems, Jun. 20-24, 2011, 10 pgs.
Pagiamtzis, Kostas, "Content-Addressable Memory Introduction", Jun. 25, 2007, (6 pgs.), retrieved from: http://www.pagiamtzis.com/cam/camintro.
Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.
International Search Report and Written Opinion for PCT Application No. PCT/US2013/043702, dated Sep. 26, 2013, (11 pgs.).
Elliot, et al., "Computational RAM: Implementing Processors in Memory", Jan.-Mar. 1999, (10 pgs.), vol. 16, Issue 1, IEEE Design and Test of Computers Magazine.

\* cited by examiner

Fig. 3A

| 301-1 | 301-2 | 301-3 | 301-4 | 301-5 | 301-6 | 301-7 | 301-8 | 301-9 | 301-10 | 301-11 | 301-12 | 301-13 | 301-14 | 301-15 | 301-16 |
|---|---|---|---|---|---|---|---|---|---|---|---|---|---|---|---|
| 0 | 1 | 0 | 0 | 1 | 1 | 1 | 0 | 1 | 0 | 0 | 1 | 0 | 1 | 0 | 0 |
| 7 | 6 | 5 | 4 | 3 | 2 | 1 | 0 | 15 | 14 | 13 | 12 | 11 | 10 | 9 | 8 |

351-1 covers 301-1 through 301-8; 351-2 covers 301-9 through 301-16; 341; 311-1

Fig. 3B

| 301-1 | 301-2 | 301-3 | 301-4 | 301-5 | 301-6 | 301-7 | 301-8 | 301-9 | 301-10 | 301-11 | 301-12 | 301-13 | 301-14 | 301-15 | 301-16 |
|---|---|---|---|---|---|---|---|---|---|---|---|---|---|---|---|
| 0 | 1 | 1 | 1 | 0 | 0 | 1 | 0 | 0 | 1 | 1 | 0 | 1 | 0 | 0 | 1 |
| 0 | 1 | 2 | 3 | 4 | 5 | 6 | 7 | 8 | 9 | 10 | 11 | 12 | 13 | 14 | 15 |

| 301-1 | 301-2 | — | — | — | — | — | — | — | — | — | — | — | — | 301-15 | 301-16 |
|---|---|---|---|---|---|---|---|---|---|---|---|---|---|---|---|
| 0 | 0 | 1 | 1 | 1 | 0 | 0 | 1 | 0 | 0 | 0 | 1 | 0 | 1 | 0 | 0 |

Fig. 3D

| 301-1 | 301-2 | 301-3 | 301-4 | 301-5 | 301-6 | 301-7 | 301-8 | 301-9 | 301-10 | 301-11 | 301-12 | 301-13 | 301-14 | 301-15 | 301-16 |
|---|---|---|---|---|---|---|---|---|---|---|---|---|---|---|---|
| 1 | 0 | 0 | 1 | 0 | 1 | 0 | 0 | 0 | 1 | 0 | 0 | 1 | 1 | 1 | 0 |
| 15 | 14 | 13 | 12 | 11 | 10 | 9 | 8 | 7 | 6 | 5 | 4 | 3 | 2 | 1 | 0 |

351-2 covers 301-1 through 301-8; 351-1 covers 301-9 through 301-16; 341 labels the lower row.

Fig. 3E

| 301-1 | 301-2 | ... | 301-15 | 301-16 |
|---|---|---|---|---|
| 0 | 0 | 1 | 1 | 0 | 0 | 0 | 0 | 1 | 0 | 0 | 1 | 1 | 1 | 0 | 0 | ns
MULTIPLE ENDIANNESS COMPATIBILITY

PRIORITY INFORMATION

This application is a Non-Provisional of U.S. Provisional Application No. 62/085,999, filed Dec. 1, 2014, the contents of which are incorporated herein by reference.

TECHNICAL FIELD

The present disclosure relates generally to semiconductor memory apparatuses and methods, and more particularly, to apparatuses and methods related to supporting multiple endianness compatibility.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems often include a number of processing resources (e.g., one or more processors), which may retrieve and execute instructions and store the results of the executed instructions to a suitable location. A processor can comprise a number of functional units (e.g., herein referred to as functional unit circuitry such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in an electronic system may be involved in providing instructions to the functional unit circuitry for execution. The instructions may be generated, for instance, by a processing resource such as a controller and/or host processor. Data (e.g., the operands on which the instructions will be executed to perform the logical operations) may be stored in a memory array that is accessible by the functional unit circuitry. The instructions and/or data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the operations and/or data may also be sequenced and/or buffered.

In many instances, the processing resources (e.g., processor and/or associated functional unit circuitry) may be external to the memory array, and data can be accessed (e.g., via a bus between the processing resources and the memory array to execute instructions). Data can be moved from the memory array to registers external to the memory array via a bus or to a host or processor. Data (e.g., bits) can be ordered based on bit significance in a bytewise big endian or bytewise little endian format. A bytewise big endian format orders bytes from most to least significant while a little endian format orders bytes from least to most significant. Bits can be ordered within each byte in bitwise big endian or bitwise little endian, among other orders.

BRIEF DESCRIPTION OF THE DRAWINGS

FIGS. 3A-3E illustrate a schematic diagram of a portion of a memory array in accordance with a number of embodiments of the present disclosure.

DETAILED DESCRIPTION

Figure 1:
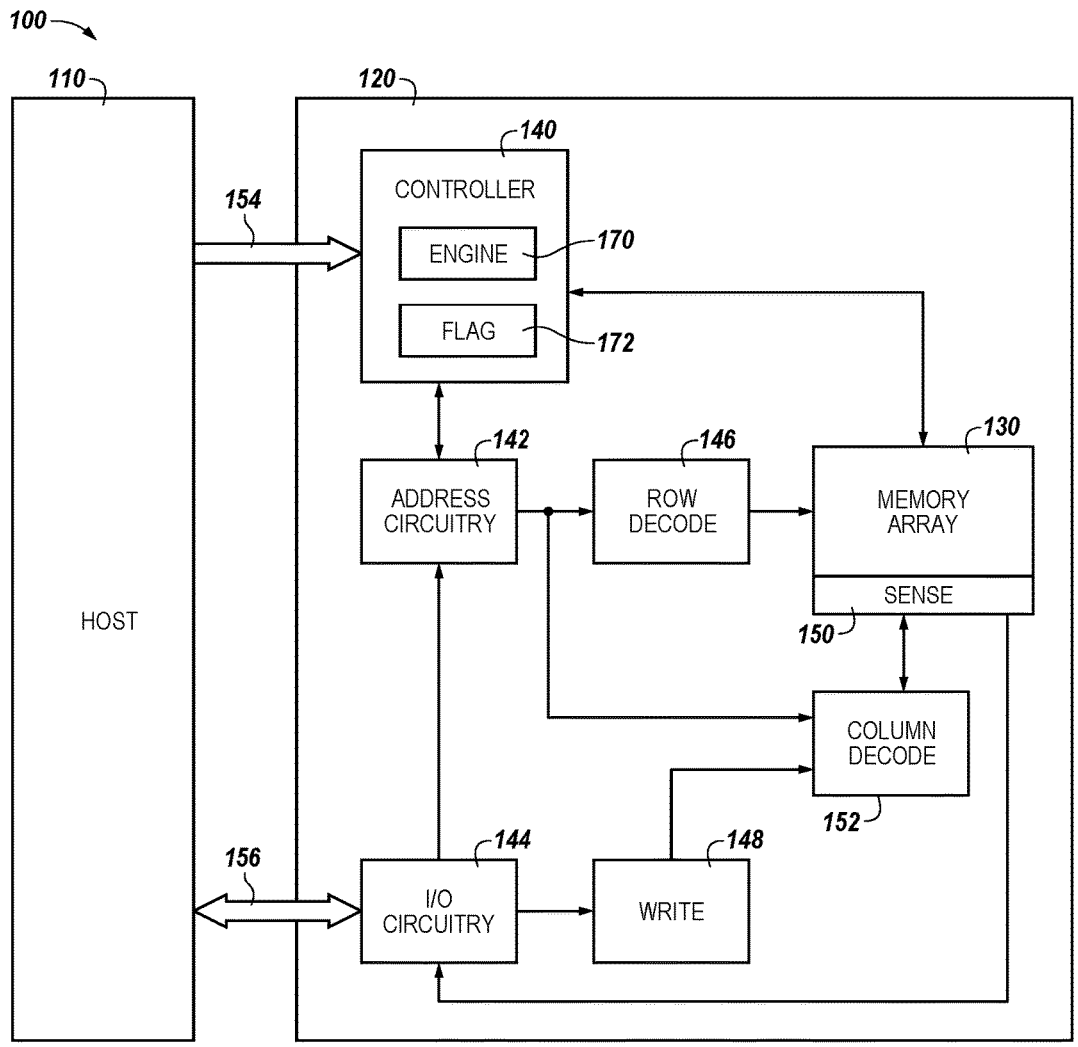
FIG. 1 is a block diagram of an apparatus in the form of a computing system including a memory device in accordance with a number of embodiments of the present disclosure.

The present disclosure includes apparatuses and methods related to multiple endianness compatibility. A method can include receiving a plurality of bytes. The method can include determining a particular endianness format of the plurality of bytes and, responsive to determining the particular endianness format is a first endianness format: reordering bits of each byte of the plurality of bytes on a bytewise basis, storing the reordered plurality of bytes in an array of memory cells, and adjusting a shift direction associated with performing a number of operations on the plurality of bytes stored in the array. In response to determining the particular endianness format is a second endianness format, the method can include storing the plurality of bytes in the array without reordering bits of the plurality of bytes.

To ensure compatibility for multiple endiannesses, a plurality of bytes received (e.g., received from a host at a controller of a memory array) in a particular endianness format (e.g., ordered in big endian or little endian) can be reordered (e.g., by reversing an ordering of the bits in each byte of the plurality of bytes such that the plurality of bytes are arranged in a bit-sequential little endian format) to be in a bit-sequential format. As described further herein, a flag (e.g., a hardware flag) can be used to indicate a particular endianness of a host, which may be associated with a non-bit-sequential order. For instance, a first state of the flag can indicate a first endianness of a host, and a second (e.g., different) state of the flag can indicate a second (e.g., different) endianness of the host.

The plurality of bytes arranged in a bit-sequential little endian format or big endian format can be stored in an array of memory cells. The bit-sequential little endian format (e.g., as illustrated in FIG. 3B) is an arrangement of the bits from a least significant bit of each byte of the plurality of bytes being stored in a most significant bit position and a most significant bit of each byte of the plurality of bytes being stored in a least significant bit position. The bit-sequential big endian format (e.g., illustrated in FIG. 3D) is an arrangement of bits from a most significant bit of each byte of a plurality of bytes being stored in a most significant bit position and a least significant bit of each byte of the plurality of bytes being stored in a least significant bit position.

Reordering the bits of a byte to be bit-sequential (with respect to a bit's significance in the byte) can provide transparent support from a host's perspective of little endian compatibility or big endian compatibility for performing operations (e.g., mathematical operations which may include shift operations performed on data stored bit-sequentially in memory). This endianness compatibility can be mainly transparent with respect to microcode used to perform the number of operations. This transparency can be due to the state of the flag indicating the endianness of the host, for example. Microcode refers to a layer of hardware-level instructions or data structures used in implementation of higher-level machine code instructions or internal state machine sequencing in digital processors. Microcode can be used in general central processing units (CPUs), microcontrollers, digital signal processors, channel controllers, disk controllers, network interface controllers, network processors, graphics processing units, and other such hardware.

For instance, bits of an element (e.g., operands or inputs that include a number of bytes representing a numerical value, such as those illustrated in FIGS. 3A-3E) in a byte-wise little endian format (but still big endian bitwise) can be sent from a host to be processed. The bits of the element can be reordered to be bit-sequential and a number of operations performed on the bit-sequential bits can be altered (e.g., shift directions modified) based on the state of the flag. The bit-sequential bits can be reordered back to the bytewise little endian (bitwise big endian) format and returned to the host transparently, independent of additional shifting operations (e.g., shifting in memory) to account for non-sequential bits. In addition, bits that are non-sequential in big endian format can be reordered to be bit-sequential, addresses can be inverted, and shift operations can be modified. The reordering of the bits can be performed independent of knowledge of how many bytes the element contains. In previous approaches, knowledge of how many bytes comprise an element could be used to determine how/when to switch bytes from little endian format to big endian format and vice versa. For example, switching a byte from a least significant byte position to a most significant byte position may use knowledge of how many total bytes there are in an element in order to know a distance to move the bytes. However, reordering bits based on a hardware flag can be performed on a bytewise basis as each byte is received so that a determination of the total bytes is irrelevant to the reordering. In this way, both bytewise big endian and bytewise little endian formats can be processed independent of additional operation calculations (as bytewise big endian is already bit-sequential and the reordering of the bytewise little endian bits sequentially orders the bits).

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "S," "T," "U," "V," "W," etc., particularly with respect to reference numerals in the drawings, indicates that a number of the particular feature so designated can be included. As used herein, "a number of" a particular thing can refer to one or more of such things (e.g., a number of memory arrays can refer to one or more memory arrays).

The figures herein follow a numbering convention in which the first digit or digits correspond to the drawing figure number and the remaining digits identify an element or component in the drawing. Similar elements or components between different figures may be identified by the use of similar digits. For example, 231 may reference element "31" in FIG. 2, and a similar element may be referenced as 331 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense FIG. 1 is a block diagram of an apparatus in the form of a computing system 100 including a memory device 120 in accordance with a number of embodiments of the present disclosure. As used herein, a memory device 120, a memory array 130, a controller 140, and/or sensing circuitry 150 might also be separately considered an "apparatus."

System 100 includes a host 110 coupled to memory device 120, which includes a memory array 130. Host 110 can be a host system such as a personal laptop computer, a desktop computer, a digital camera, a mobile telephone, or a memory card reader, among various other types of hosts. Host 110 can include a system motherboard and/or backplane and can include a number of processing resources (e.g., one or more processors, microprocessors, or some other type of controlling circuitry). The system 100 can include separate integrated circuits or both the host 110 and the memory device 120 can be on the same integrated circuit. The system 100 can be, for instance, a server system and/or a high performance computing (HPC) system and/or a portion thereof. Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells). An example DRAM array is described in association with FIGS. 2 and 3.

The memory device 120 includes address circuitry 142 to latch address signals provided over an I/O bus 156 (e.g., a data bus) through I/O circuitry 144. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can read and latch a page (e.g., row) of data from the memory array 130. The I/O circuitry 144 can be used for bi-directional data communication with host 110 over the I/O bus 156. The write circuitry 148 is used to write data to the memory array 130.

Controller 140 decodes signals provided by control bus 154 from the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can comprise hardware, software, and/or firmware, and can be, for example, a state machine, a sequencer, or some other type of controller. While FIG. 1 illustrates arrows indicating communication between controller 140 and address circuitry 142 and memory array 130, embodiments are no so limited. Controller 140 can provide signals to operate a number of elements in memory device 120 including I/O circuitry 144, row decode 146, write circuitry 148, memory array 130, sense circuitry 150, and column decode circuitry 152. The controller 140 can perform a number of shift operations (e.g., via shifting circuitry 223 shown in FIG. 2A). The controller 140 can include an engine (e.g., a reordering engine) 170 that performs a number of operations to reorder data (e.g., bits and/or bytes) received thereto. The engine 170 can reorder data received thereto (e.g., from host 110 and/or array 130) and transmit the reordered data to a desired location (e.g., host 110, array 130, and/or elsewhere). The controller 140 can be coupled to a host 110 in a similar manner (e.g., in relation to its wiring) for a number of endiannesses (e.g., little endianness and big endianness) such that the host 110 does not have an endianness fixed in hardware. Reordering of bits can be performed based on a flag (e.g., an indicator status such as a status of a register) 172 whose value is not fixed in the hardware. Engine 170 can comprise hardware, software, and/or firmware.

Reordering the bits and bytes can be performed on an element including a number of bytes. The bits can be ordered based on a significance of each bit within a byte. The bytes can be ordered on based on a significance of the byte within an element. Performing operations on the elements can include shifting bits in a particular direction (e.g., in a more significant or less significant bit position direction). The direction of the shift (e.g., right or left) can be determined based on the bit-ordering format, for instance. For example, a bit can be shifted toward a more significant bit or a less significant bit based on what operation is being performed. If the bits are ordered from most significant to least significant and a shift is in the direction of toward more significant bits, the bits would shift towards the left. If the bits are ordered from least significant to most significant and a shift is in the direction of toward more significant bits, the bits would shift towards the right, and so forth.

Sequential bits can be shifted based on the number of shifts corresponding to a particular operation. Non-sequential bits can be shifted based on the distance to the next sequential bit. For example, if a first and second bit in sequence is next to one another and the operation is to perform one shift, the bit can move one position. However, if the first and second bit are out of sequence by eight positions (e.g., the size of a byte if they are sequentially off by a byte), one shift to be performed by the operation would turn into eight shifts since they are eight positions out of sequence. Ordering the bits sequentially can improve efficiency of shifting and decrease the number of calculations performed when performing an operation.

An example of the sensing circuitry 150 is described further below in association with FIGS. 2A and 2B. For instance, in a number of embodiments, the sensing circuitry 150 can comprise a number of sense amplifiers and a number of compute components, each of which may comprise a latch serving as an accumulator and can be used to perform logical operations (e.g., on data associated with complementary sense lines). In a number of embodiments, the sensing circuitry (e.g., 150) can be used to perform a number of operations (e.g., mathematical operations) using data stored in array 130 as inputs and store the results of the operations back to the array 130 without transferring via a sense line address access (e.g., without firing a column decode signal). As such, a mathematical operation can be performed using sensing circuitry 150 rather than and/or in addition to being performed by processing resources external to the sensing circuitry 150 (e.g., by a processor associated with host 110 and/or other processing circuitry, such as ALU circuitry, located on device 120 (e.g., on controller 140 or elsewhere)).

In various previous approaches, data associated with an operation, for instance, would be read from memory via sensing circuitry and provided to an external ALU. The external ALU circuitry would perform the operations (e.g., functions) using the elements (which may be referred to as operands or inputs) and the result could be transferred back to the array via the local I/O lines. In contrast, in a number of embodiments of the present disclosure, sensing circuitry (e.g., 150) is configured to perform an operation on data stored in memory cells in memory array 130 and store the result back to the array 130 without enabling a local I/O line coupled to the sensing circuitry. The operations performed in memory array 130 includes a number of shift operations, the direction of which may be affected by the format of the data (e.g., whether in big endian or little endian formats). Data in big endian format (e.g., from most significant bit to least significant bit in a bit-contiguous fashion) may include shifting in a first direction (e.g., left shift toward a most significant bit) while data in little endian format (e.g., from least significant bit to most significant bit in a bit-contiguous fashion) may include shifting a different direction (e.g., right shift toward a most significant bit). However, by reordering the data to be bit-sequential in both big endian and little endian formats, the shifting operations can be simplified and replicated by reversing the directions of the shift.

Figure 2A:
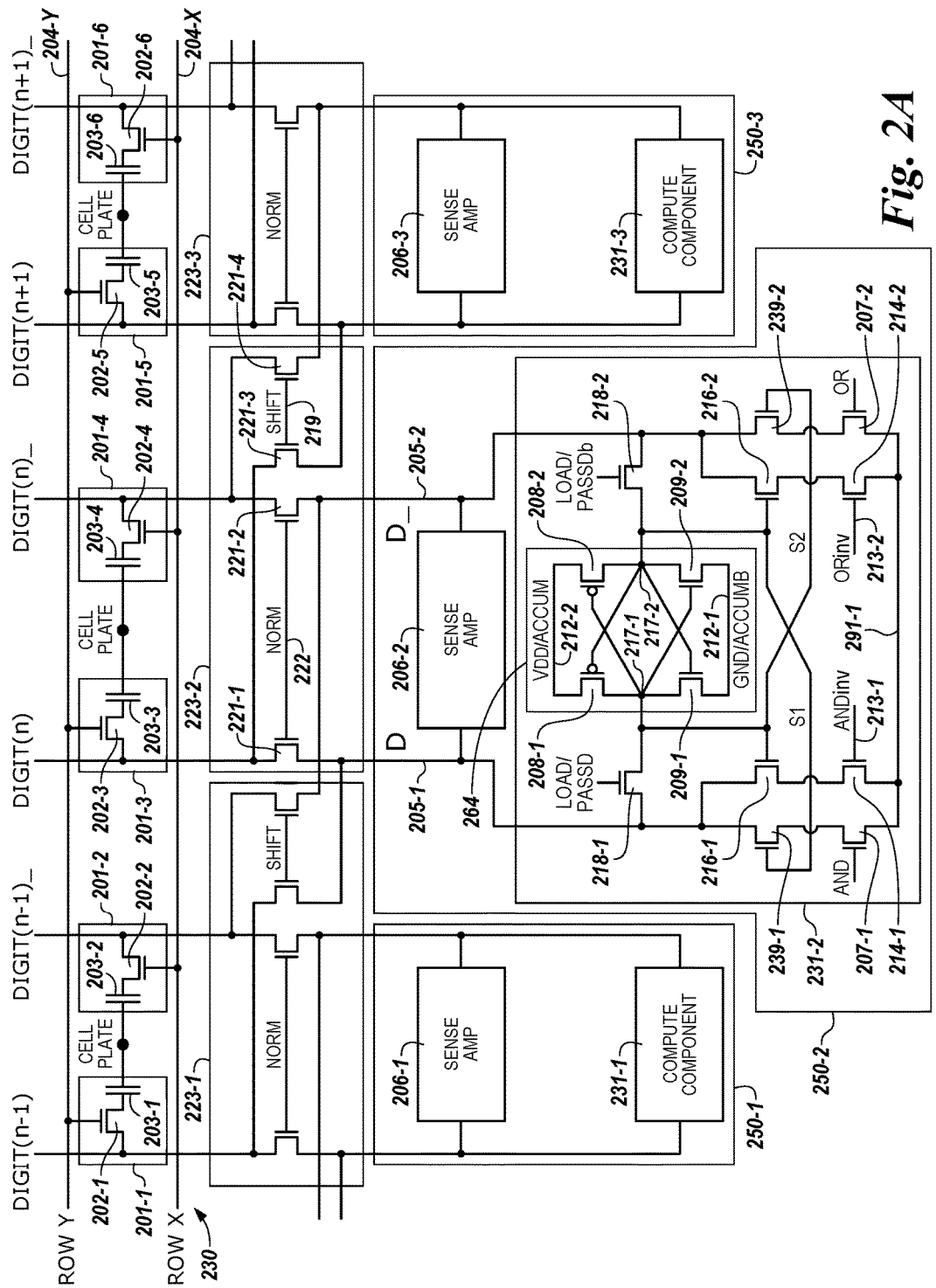
FIG. 2A illustrates a schematic diagram of a portion of a memory array in accordance with a number of embodiments of the present disclosure.

FIG. 2A illustrates a schematic diagram of a portion of a memory array 230 in accordance with a number of embodiments of the present disclosure. A memory cell comprises a storage element (e.g., capacitor) and an access device (e.g., transistor). For instance, memory cell 201-1 comprises transistor 202-1 and capacitor 203-1, memory cell 201-2 comprises transistor 202-2 and capacitor 203-2, memory cell 201-3 comprises transistor 202-3 and capacitor 203-3, and memory cell 201-4 comprises transistor 202-4 and capacitor 203-4, etc. In this example, the memory array 230 is a DRAM array of 1T1C (one transistor one capacitor) memory cells. In a number of embodiments, the memory cells may be destructive read memory cells (e.g., reading the data stored in the cell destroys the data such that the data originally stored in the cell is refreshed after being read). The cells of the memory array 230 are arranged in rows coupled by word lines 204-X (Row X), 204-Y (Row Y), etc., and columns coupled by pairs of complementary data lines DIGIT(n−1)/DIGIT(n−1)_, DIGIT(n)/DIGIT(n)_, DIGIT(n+1)/DIGIT(n+1)_. The individual data lines corresponding to each pair of complementary data lines can also be referred to as data lines 205-1 (D) and 205-2 (D_) respectively. Although only three pair of complementary data lines are shown in FIG. 2A, embodiments of the present disclosure are not so limited, and an array of memory cells can include additional columns of memory cells and/or data lines (e.g., 4,096, 8,192, 16,384, etc.).

Memory cells can be coupled to different data lines and/or word lines. For example, a first source/drain region of a transistor 202-3 can be coupled to data line 205-1 (D), a second source/drain region of transistor 202-3 can be coupled to capacitor 203-3, and a gate of a transistor 202-3 can be coupled to word line 204-X. A first source/drain region of a transistor 202-4 can be coupled to data line 205-2 (D_), a second source/drain region of transistor 202-4 can be coupled to capacitor 203-4, and a gate of a transistor 202-4 can be coupled to word line 204-Y. The cell plate, as shown in FIG. 2A, can be coupled to each of capacitors 203-3 and 203-4. The cell plate can be a common node to which a reference voltage (e.g., ground) can be applied in various memory array configurations.

The memory array 230 is coupled to sensing circuitry 250-1, 250-2, 250-3, etc., in accordance with a number of embodiments of the present disclosure. Sensing circuitry comprises a sense amplifier and a compute component corresponding to respective columns of memory cells (e.g., coupled to respective pairs of complementary data lines). In this example, the sensing circuitry 250-1 comprises a sense amplifier 206-1 and a compute component 231-1 corresponding to respective columns of memory cells (e.g., memory cells 201-1 and 201-2 coupled to respective pairs of complementary data lines). Sensing circuitry 250-2 comprises a sense amplifier 206-2 and a compute component 231-2 corresponding to respective columns of memory cells (e.g., memory cells 201-3 and 201-4 coupled to respective pairs of complementary data lines). Sensing circuitry 250-3 comprises a sense amplifier 206-3 and a compute component 231-3 corresponding to respective columns of memory cells (e.g., memory cells 201-5 and 201-6 coupled to respective pairs of complementary data lines). A sense amplifier (e.g., sense amplifier 206-1) can comprise a cross coupled latch, which can be referred to herein as a primary latch. The sense amplifier (e.g., sense amplifier 206-1) can be configured, for example, as described with respect to FIG. 2B.

In the example illustrated in FIG. 2A, the circuitry corresponding to compute component 231-2 comprises a static latch 264 and an additional ten transistors that implement, among other things, a dynamic latch. For ease of reference, compute component 231-2 has been illustrated in an expanded format to describe the functioning of the compute component. Additional compute components (e.g., compute components 231-1 and 231-3) include elements of the expanded format of compute component 231-2 but are not illustrated in FIG. 2A. The dynamic latch and/or static latch of the compute component 231-2 can be collectively referred to herein as a secondary latch, which can serve as an accumulator. As such, the compute component 231-2 can operate as and/or be referred to herein as an accumulator. The compute component 231-2 can be coupled to each of the data lines D 205-1 and D_205-2 as shown in FIG. 2A. However, embodiments are not limited to this example. The transistors of compute component 231-2 can all be n-channel transistors (e.g., NMOS transistors), for example.

In this example, data line D 205-1 can be coupled to a first source/drain region of transistors 216-1 and 239-1, as well as to a first source/drain region of load/pass transistor 218-1. Data line D_205-2 can be coupled to a first source/drain region of transistors 216-2 and 239-2, as well as to a first source/drain region of load/pass transistor 218-2.

The gates of load/pass transistor 218-1 and 218-2 can be commonly coupled to a LOAD control signal, or respectively coupled to a PASSD/PASSDB control signal, as discussed further below. A second source/drain region of load/pass transistor 218-1 can be directly coupled to the gates of transistors 216-1 and 239-2. A second source/drain region of load/pass transistor 218-2 can be directly coupled to the gates of transistors 216-2 and 239-1.

A second source/drain region of transistor 216-1 can be directly coupled to a first source/drain region of pull-down transistor 214-1. A second source/drain region of transistor 239-1 can be directly coupled to a first source/drain region of pull-down transistor 207-1. A second source/drain region of transistor 216-2 can be directly coupled to a first source/drain region of pull-down transistor 214-2. A second source/drain region of transistor 239-2 can be directly coupled to a first source/drain region of pull-down transistor 207-2. A second source/drain region of each of pull-down transistors 207-1, 207-2, 214-1, and 214-2 can be commonly coupled together to a reference voltage (e.g., ground (GND)). A gate of pull-down transistor 207-1 can be coupled to an AND control signal line, a gate of pull-down transistor 214-1 can be coupled to an ANDinv control signal line 213-1, a gate of pull-down transistor 214-2 can be coupled to an ORinv control signal line 213-2, and a gate of pull-down transistor 207-2 can be coupled to an OR control signal line.

The gate of transistor 239-1 can be referred to as node S1, and the gate of transistor 239-2 can be referred to as node S2. The circuit shown in FIG. 2A stores accumulator data dynamically on nodes S1 and S2. Activating the LOAD control signal causes load/pass transistors 218-1 and 218-2 to conduct, and thereby load complementary data onto nodes S1 and S2. The LOAD control signal can be elevated to a voltage greater than $V_{DD}$ to pass a full $V_{DD}$ level to S1/S2. However, elevating the LOAD control signal to a voltage greater than $V_{DD}$ is optional, and functionality of the circuit shown in FIG. 2A is not contingent on the LOAD control signal being elevated to a voltage greater than $V_{DD}$.

The configuration of compute component 231-2 shown in FIG. 2A has the benefit of balancing the sense amplifier for functionality when the pull-down transistors 207-1, 207-2, 214-1, and 214-2 are conducting before the sense amplifier 206-2 is fired (e.g., during pre-seeding of the sense amplifier 206-2). As used herein, firing the sense amplifier 206-2 refers to enabling the sense amplifier 206-2 to set the primary latch and subsequently disabling the sense amplifier 206-2 to retain the set primary latch. Performing logical operations after equilibration is disabled (in the sense amp), but before the sense amplifier fires, can save power usage because the latch of the sense amplifier does not have to be "flipped" using full rail voltages (e.g., $V_{DD}$, GND).

Inverting transistors can pull-down a respective data line in performing certain logical operations. For example, transistor 216-1 (having a gate coupled to S2 of the dynamic latch) in series with transistor 214-1 (having a gate coupled to an ANDinv control signal line 213-1) can be operated to pull-down data line 205-1 (D), and transistor 216-2 (having a gate coupled to S1 of the dynamic latch) in series with transistor 214-2 (having a gate coupled to an ANDinv control signal line 213-2) can be operated to pull-down data line 205-2 (D_).

The latch 264 can be controllably enabled by coupling to an active negative control signal line 212-1 (ACCUMB) and an active positive control signal line 212-2 (ACCUM) rather than be configured to be continuously enabled by coupling to ground and $V_{DD}$. In various embodiments, load/pass transistors 208-1 and 208-2 can each having a gate coupled to one of a LOAD control signal or a PASSD/PASSDB control signal.

According to some embodiments, the gates of load/pass transistors 218-1 and 218-2 can be commonly coupled to a LOAD control signal. In the configuration where the gates of load/pass transistors 218-1 and 218-2 are commonly coupled to the LOAD control signal, transistors 218-1 and 218-2 can be load transistors. Activating the LOAD control signal causes the load transistors to conduct, and thereby load complementary data onto nodes S1 and S2. The LOAD control signal can be elevated to a voltage greater than $V_{DD}$ to pass a full $V_{DD}$ level to S1/S2. However, the LOAD control signal need not be elevated to a voltage greater than $V_{DD}$ is optional, and functionality of the circuit shown in FIG. 2A is not contingent on the LOAD control signal being elevated to a voltage greater than $V_{DD}$.

According to some embodiments, the gate of load/pass transistor 218-1 can be coupled to a PASSD control signal, and the gate of load/pass transistor 218-2 can be coupled to a PASSDB control signal. In the configuration where the gates of transistors 218-1 and 218-2 are respectively coupled to one of the PASSD and PASSDB control signals, transistors 218-1 and 218-2 can be pass transistors. Pass transistors can be operated differently (e.g., at different times and/or under different voltage/current conditions) than load transistors. As such, the configuration of pass transistors can be different than the configuration of load transistors.

Load transistors are constructed to handle loading associated with coupling data lines to the local dynamic nodes S1 and S2, for example. Pass transistors are constructed to handle heavier loading associated with coupling data lines to an adjacent accumulator (e.g., through the shift circuitry 223-2 in memory array 230, as shown in FIG. 2A). According to some embodiments, load/pass transistors 218-1 and 218-2 can be configured to accommodate the heavier loading corresponding to a pass transistor but be coupled and operated as a load transistor. Load/pass transistors 218-1 and 218-2 configured as pass transistors can also be utilized as load transistors. However, load/pass transistors 218-1 and 218-2 configured as load transistors may not be capable of being utilized as pass transistors.

In a number of embodiments, the compute component 231-2, including the latch 264, can comprise a number of transistors formed on pitch with the transistors of the corresponding memory cells of an array (e.g., array 230 shown in FIG. 2A) to which they are coupled, which may conform to a particular feature size (e.g., $4F^2$, $6F^2$, etc.). According to various embodiments, latch 264 includes four transistors 208-1, 208-2, 209-1, and 209-2 coupled to a pair of complementary data lines D 205-1 and D_ 205-2 through load/pass transistors 218-1 and 218-2. However, embodiments are not limited to this configuration. The latch 264 can be a cross coupled latch (e.g., gates of a pair of transistors, such as n-channel transistors (e.g., NMOS transistors) 209-1 and 209-2 are cross coupled with the gates of another pair of transistors, such as p-channel transistors (e.g., PMOS transistors) 208-1 and 208-2). As described further herein, the cross coupled latch 264 can be referred to as a static latch.

The voltages or currents on the respective data lines D and D_ can be provided to the respective latch inputs 217-1 and 217-2 of the cross coupled latch 264 (e.g., the input of the secondary latch). In this example, the latch input 217-1 is coupled to a first source/drain region of transistors 208-1 and 209-1 as well as to the gates of transistors 208-2 and 209-2. Similarly, the latch input 217-2 can be coupled to a first source/drain region of transistors 208-2 and 209-2 as well as to the gates of transistors 208-1 and 209-1.

Figure 2B:
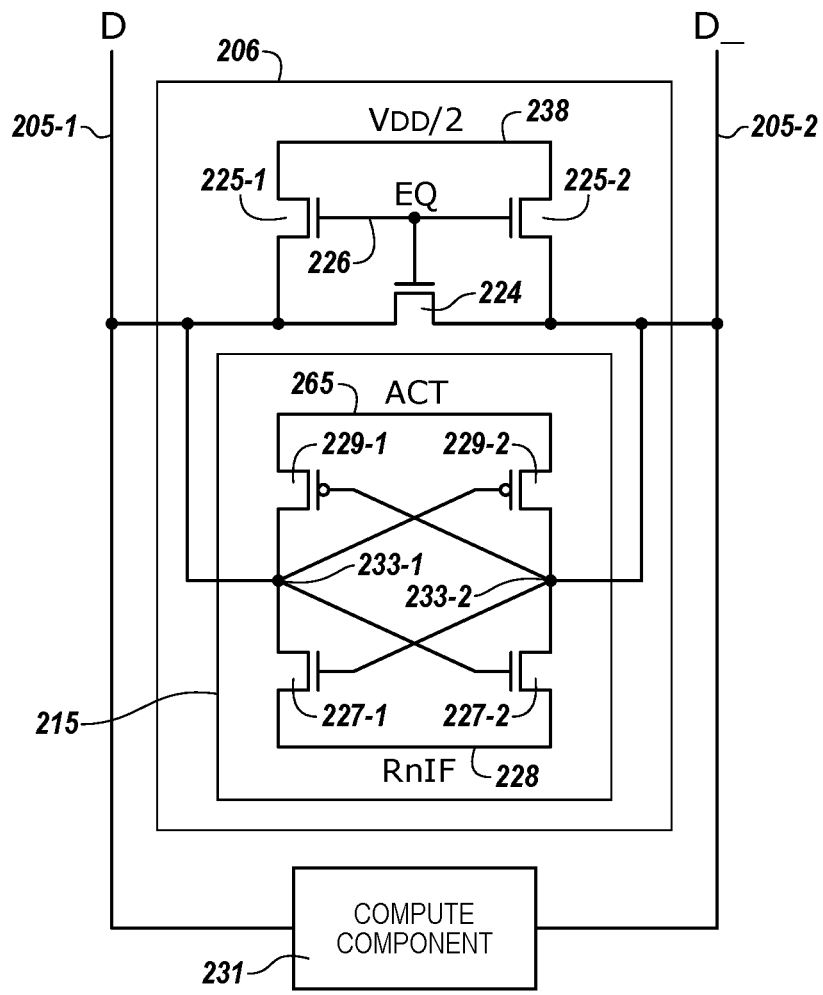
FIG. 2B illustrates a schematic diagram of a portion of sensing circuitry in accordance with a number of embodiments of the present disclosure.

In this example, a second source/drain region of transistor 209-1 and 209-2 is commonly coupled to a negative control signal line 1312-1 (e.g., ground (GND) or ACCUMB control signal similar to control signal RnIF shown in FIG. 2B with respect to the primary latch). A second source/drain region of transistors 208-1 and 208-2 is commonly coupled to a positive control signal line 212-2 (e.g., $V_{DD}$ or ACCUM control signal similar to control signal ACT shown in FIG. 2B with respect to the primary latch). The positive control signal 212-2 can provide a supply voltage (e.g., $V_{DD}$) and the negative control signal 212-1 can be a reference voltage (e.g., ground) to enable the cross coupled latch 264. According to some embodiments, the second source/drain region of transistors 208-1 and 208-2 are commonly coupled directly to the supply voltage (e.g., $V_{DD}$), and the second source/drain region of transistor 209-1 and 209-2 are commonly coupled directly to the reference voltage (e.g., ground) so as to continuously enable latch 264.

The enabled cross coupled latch 264 operates to amplify a differential voltage between latch input 217-1 (e.g., first common node) and latch input 217-2 (e.g., second common node) such that latch input 217-1 is driven to either the activated positive control signal voltage (e.g., $V_{DD}$) or the activated negative control signal voltage (e.g., ground), and latch input 217-2 is driven to the other of the activated positive control signal voltage (e.g., $V_{DD}$) or the activated negative control signal voltage (e.g., ground).

As shown in FIG. 2A, the sense amplifier 206-2 and the compute component 231-2 can be coupled to the array 230 via shift circuitry 223-2. In this example, the shift circuitry 223-2 comprises a pair of isolation devices (e.g., isolation transistors 221-1 and 221-2) coupled to data lines 205-1 (D) and 205-2 (D_), respectively). The isolation transistors 221-1 and 221-2 are coupled to a control signal 222 (NORM) that, when activated, enables (e.g., turns on) the isolation transistors 221-1 and 221-2 to couple the corresponding sense amplifier 206-2 and compute component 231-2 to a corresponding column of memory cells (e.g., to a corresponding pair of complementary data lines 205-1 (D) and 205-2 (D_)). According to various embodiments, conduction of isolation transistors 221-1 and 221-2 can be referred to as a "normal" configuration of the shift circuitry 223-2.

In the example illustrated in FIG. 2A, the shift circuitry 223-2 includes another (e.g., a second) pair of isolation devices (e.g., isolation transistors 221-3 and 221-4) coupled to a complementary control signal 219 (SHIFT), which can be activated, for example, when NORM is deactivated. The isolation transistors 221-3 and 221-4 can be operated (e.g., via control signal 219) such that a particular sense amplifier 206-2 and compute component 231-2 are coupled to a different pair of complementary data lines (e.g., a pair of complementary data lines different than the pair of complementary data lines to which isolation transistors 221-1 and 221-2 couple the particular sense amplifier 206-2 and compute component 231-2), or can couple a particular sense amplifier 206-2 and compute component 231-2 to another memory array (and isolate the particular sense amplifier 206-2 and compute component 231-2 from a first memory array). According to various embodiments, the shift circuitry 223-2 can be arranged as a portion of (e.g., within) the sense amplifier 206-2, for instance.

Although the shift circuitry 223-2 shown in FIG. 2A includes isolation transistors 221-1 and 221-2 used to couple particular sensing circuitry 250-2 (e.g., a particular sense amplifier 206-2 and corresponding compute component 231-2) to a particular pair of complementary data lines 205-1 (D) and 205-2 (D_) (e.g., DIGIT(n) and DIGIT(n)_) and isolation transistors 221-3 and 221-4 are arranged to couple the particular sensing circuitry 250-2 to an adjacent pair of complementary data lines in one particular direction (e.g., adjacent data lines DIGIT(n+1) and DIGIT(n+1)_ shown to the right in FIG. 2A), embodiments of the present disclosure are not so limited. For instance, shift circuitry can include isolation transistors 221-1 and 221-2 used to couple particular sensing circuitry to a particular pair of complementary data lines (e.g., DIGIT(n) and DIGIT(n)_ and isolation transistors 221-3 and 221-4 arranged so as to be used to couple the particular sensing circuitry to an adjacent pair of complementary data lines in another particular direction (e.g., adjacent data lines DIGIT(n−1) and DIGIT(n−1)_ shown to the left in FIG. 2A). Shift circuitry 223-1 can include isolation transistors used to couple particular sensing circuitry 250-1 to a particular pair of complementary data lines (e.g., DIGIT(n−1) and DIGIT(n−1)_) and isolation transistors arranged to couple the particular sensing circuitry 250-1 to an adjacent pair of complementary data lines in one particular direction (e.g., adjacent data lines DIGIT(n) and DIGIT(n) shown in FIG. 2A). Shift circuitry 223-3 can include isolation transistors used to couple particular 250-3 to a particular pair of complementary data lines (e.g., DIGIT(n+1) and DIGIT(n+1)_) and isolation transistors arranged to couple the particular sensing circuitry 250-3 to an adjacent pair of complementary data lines in one particular direction (e.g., adjacent data lines DIGIT (n) and DIGIT(n)_ to the left and DIGIT(n+2) and DIGIT(n+2)_ to the right (not shown)).

Embodiments of the present disclosure are not limited to the configuration of shift circuitry 223-2 shown in FIG. 2A. For example, determining whether to shift in a particular direction to perform a shift operation is independent of the circuitry implementation. In a number of embodiments, shift circuitry 223-2 such as that shown in FIG. 2A can be operated (e.g., in conjunction with sense amplifiers 206-2 and compute components 231-2) in association with performing mathematical operations such as adding and subtracting operations without transferring data out of the sensing circuitry 250 via an I/O line (e.g., local I/O line (IO/IO_)), for instance.

Although not shown in FIG. 2A, each column of memory cells can be coupled to a column decode line that can be activated to transfer, via local I/O line, a data value from a corresponding sense amplifier 206-2 and/or compute component 231-2 to a control component external to the array such as an external processing resource (e.g., host processor and/or other functional unit circuitry). The column decode line can be coupled to a column decoder (e.g., column decoder). However, as described herein, in a number of embodiments, data need not be transferred via such I/O lines to perform logical operations in accordance with embodiments of the present disclosure. In a number of embodiments, shift circuitry 223-2 can be operated in conjunction with sense amplifiers 206-2 and compute components 231-2 to perform without transferring data to a control component external to the array, for instance.

FIG. 2B is a schematic diagram illustrating a portion of sensing circuitry in accordance with a number of embodiments of the present disclosure. According to various embodiments, sense amplifier 206-2 can comprise a cross coupled latch. However, embodiments of the sense amplifier 206-2 are not limited to a cross coupled latch. As an example, the sense amplifier 206-2 in FIG. 2B can be current-mode sense amplifier and/or single-ended sense amplifier (e.g., sense amplifier coupled to one data line). Also, embodiments of the present disclosure are not limited to a folded data line architecture.

In a number of embodiments, a sense amplifier (e.g., 206-2) can comprise a number of transistors formed on pitch with the transistors of the corresponding compute component 231-2 and/or the memory cells of an array (e.g., 230 shown in FIG. 2A) to which they are coupled, which may conform to a particular feature size (e.g., $4F^2$, $6F^2$, etc.). The sense amplifier 206-2 comprises a latch 215 including four transistors coupled to a pair of complementary data lines D 205-1 and D_205-2. The latch 215 can be a cross coupled latch (e.g., gates of a pair of transistors, such as n-channel transistors (e.g., NMOS transistors) 227-1 and 227-2 are cross coupled with the gates of another pair of transistors, such as p-channel transistors (e.g., PMOS transistors) 229-1 and 229-2). As described further herein, the latch 215 comprising transistors 227-1, 227-2, 229-1, and 229-2 can be referred to as a primary latch. However, embodiments are not limited to this example.

The voltages or currents on the respective data lines D and D_ can be provided to the respective latch inputs 233-1 and 233-2 of the cross coupled latch 215 (e.g., the input of the secondary latch). In this example, the latch input 233-1 is coupled to a first source/drain region of transistors 227-1 and 229-1 as well as to the gates of transistors 227-2 and 229-2. Similarly, the latch input 233-2 can be coupled to a first source/drain region of transistors 227-2 and 229-2 as well as to the gates of transistors 227-1 and 229-1. The compute component 231-2, which may be referred to herein as an accumulator, can be coupled to latch inputs 233-1 and 233-2 of the cross coupled latch 215 as shown; however, embodiments are not limited to the example shown in FIG. 2B.

In this example, a second source/drain region of transistor 227-1 and 227-2 is commonly coupled to an active negative control signal 228 (RnIF). A second source/drain region of transistors 229-1 and 229-2 is commonly coupled to an active positive control signal 290 (ACT). The ACT signal 290 can be a supply voltage (e.g., $V_{DD}$) and the RnIF signal can be a reference voltage (e.g., ground). Activating signals 228 and 290 enables the cross coupled latch 215.

The enabled cross coupled latch 215 operates to amplify a differential voltage between latch input 233-1 (e.g., first common node) and latch input 233-2 (e.g., second common node) such that latch input 233-1 is driven to one of the ACT signal voltage and the RnIF signal voltage (e.g., to one of $V_{DD}$ and ground), and latch input 233-2 is driven to the other of the ACT signal voltage and the RnIF signal voltage.

The sense amplifier 206-2 can also include circuitry configured to equilibrate the data lines D and D_(e.g., in association with preparing the sense amplifier for a sensing operation). In this example, the equilibration circuitry comprises a transistor 224 having a first source/drain region coupled to a first source/drain region of transistor 225-1 and data line D 205-1. A second source/drain region of transistor 224 can be coupled to a first source/drain region of transistor 225-2 and data line D 205-2. A gate of transistor 224 can be coupled to gates of transistors 225-1 and 225-2.

The second source drain regions of transistors 225-1 and 225-2 are coupled to an equilibration voltage 238 (e.g., $V_{DD}/2$), which can be equal to $V_{DD}$ where $V_{DD}$ is a supply voltage associated with the array. The gates of transistors 224, 225-1, and 225-2 can be coupled to control signal 225 (EQ). As such, activating EQ enables the transistors 224, 225-1, and 225-2, which effectively shorts data line D to data line D_such that the data lines D and D_are equilibrated to equilibration voltage $V_{DD}/2$. According to a number of embodiments of the present disclosure, a number of logical operations can be performed using the sense amplifier 206-2 and compute component 231-2, and the result can be stored in the sense amplifier and/or compute component.

The sensing circuitry 250 can be operated in several modes to perform logical operations, including a first mode in which a result of the logical operation is initially stored in the sense amplifier 206-2, and a second mode in which a result of the logical operation is initially stored in the compute component 231-2. Additionally with respect to the first operating mode, sensing circuitry 250 can be operated in both pre-sensing (e.g., sense amps fired before logical operation control signal active) and post-sensing (e.g., sense amps fired after logical operation control signal active) modes with a result of a logical operation being initially stored in the sense amplifier 206-2.

As described further below, the sense amplifier 206-2 can, in conjunction with the compute component 231-2, be operated to perform various logical operations using data from an array as input. In a number of embodiments, the result of a logical operation can be stored back to the array without transferring the data via a data line address access (e.g., without firing a column decode signal such that data is transferred to circuitry external from the array and sensing circuitry via local I/O lines). As such, a number of embodiments of the present disclosure can enable performing various operations (e.g., logical operations, mathematical operations, etc.) using less power than various previous approaches. Additionally, since a number of embodiments eliminate the need to transfer data across I/O lines in order to perform operations (e.g., between memory and discrete processor), a number of embodiments can enable an increased parallel processing capability as compared to previous approaches.

FIGS. 3A-3E illustrate schematic diagrams of a portion of a memory array storing data in accordance with a number of embodiments of the present disclosure. FIG. 3A illustrates an element stored in a little endian bytewise, big endian bitwise format in cells 301- to 301-16. FIG. 3B illustrates the same element illustrated in FIG. 3A but stored in a little endian bytewise, little endian bitwise format. The element illustrated in FIG. 3A is reordered to the stored element in FIG. 3B in order to be bit-sequential for shifting purposes. FIG. 3C illustrates an example of the element stored in FIG. 3B but shifted toward a most significant bit direction (e.g., rightward which is upward numerically). FIG. 3D illustrates the same element as stored in FIGS. 3A-3C but stored in a big endian bitwise, big endian bitwise format. FIG. 3E illustrates an example of the element shifted toward a most significant bit direction (e.g., leftward and upward numerically).

As used herein, little endian refers to an ordering of least significant to most significant (e.g., least significant bit/byte stored in a smallest or left-most address and most significant bit/byte stored in a largest or right-most address). As used herein, big endian refers to an ordering of most significant to least significant (e.g., most significant bit/byte stored in a smallest or left-most address and least significant bit/byte stored in a largest or right-most address).

A shift operation can be performed on an element based on a flag (e.g., an indication of endianness). For example, if an element is in bytewise little endian, bitwise little endian format (e.g., little endian and bit-sequential), a flag can be set and can indicate to shift to the right when shifting toward a most significant bit direction (e.g., upward numerically toward a higher numerical order). If an element is in a bytewise big endian, bitwise big endian format, the flag may not be set and indicates to shift to the left toward a most significant bit direction (e.g., upward numerically).

FIG. 3A illustrates a portion of a row 311-1 of memory cells 301-1 to 301-16 storing an element (e.g., a number of bits representing a number of data values) Each of the plurality of memory cells 301-1 to 301-16 can be coupled to a corresponding sense line and a corresponding access line. Each of the corresponding sense lines can be coupled to sensing circuitry. For example, memory cell 301-1 (e.g., corresponding to memory cell 201-3 in FIG. 2A) is coupled to a particular sense line (e.g., sense line 205-1) and to a particular access line (e.g., access line 204-Y). The sense line (e.g., 205-1) is coupled to sensing circuitry (e.g., sensing circuitry 250-2). Memory cell 301-1 can correspond to memory cell 201-1 in FIG. 2A, cell 301-2 can correspond to cell 201-2, cell 301-3 can correspond to cell 201-3, cell 301-4 can correspond to cell 201-4, cell 301-4 can correspond to cell 201-5, and cell 301-5 can correspond to cell 201-6. Cells 301-7 to 301-16 can correspond to a number of additional cells coupled to the particular access line (e.g., 204-Y) and to physically contiguous sense lines (e.g., 205). While the example given describes a correspondence using both cells (e.g., cells 203-3 and 203-4) coupled to a pair of complementary sense lines (e.g., sense lines 205-1 and 205-2), embodiments are not so limited. For example, cell 301-1 can correspond to cell 201-1 and cell 301-2 can correspond to cell 201-3, thereby using a cell coupled to each of a first sense line of the pair of complementary sense lines.

In this example, a 16-bit element is stored in memory cells 301-1 to 301-16. The example 16-bit element includes two (2) bytes 351-1 and 351-2. However, elements are not limited to a particular size (e.g., bits and/or bytes). The element in FIG. 3A is represented by the bit pattern [0100111010010100], which represents a particular data value (e.g., a base ten numerical value). For instance, the first byte 351-1 (e.g., the byte stored in cells 301-1 to 301-8 as bit pattern [0100 1110]) represents a numerical value of 78. For example, the first byte 351-1 includes bits with sequence numbers 341 of 0 to 7. The $0^{th}$ sequence number represents $2^0$, the $1^{st}$ sequence number represents $2^1$, the $2^{nd}$ sequence number represents $2^2$, etc. Therefore, since a bit value of 1 is in the $1^{st}$, $2^{nd}$, $3^{rd}$, and $6^{th}$ sequence number positions, the first byte 351-1 can be calculated by adding $(2^1)+(2^2)+(2^3)+(2^6)$, which is 2+4+8+64 and equals 78. The second byte 351-2 (e.g., the byte stored in cells 301-8 to 301-16 as bit pattern [10010100]) represents a numerical value of 148. For example, for the second byte 351-2 alone (e.g., considered without reference to the first byte 351-1), a bit value of 1 is in the $2^{nd}$, $4^{th}$, and $7^{th}$ sequence number position (illustrated as $10^{th}$, $12^{th}$, and $15^{th}$, in FIG. 3A due to it illustrating the element sequence number and not the second byte sequence numbers in isolation). The second byte 351-2 alone can be calculated by $(2^2)+(2^4)+(2^7)$, which is 4+16+128 and equals 148. The overall numerical value of the 16-bit element, which comprises bytes 351-1 and 351-2, is 38,036. For example, the second byte 351-2 (when considered in relation to the element including the first byte 351-1) has a bit value of 1 stored in the 10th, 12th, and 15th sequence number 341 positions and can be calculated by $(2^{10})+(2^{12})+(2^{15})$, which is 1,024+4,096+32,768 and equals 37,888. The numerical value of the second byte 351-2 (e.g., 37,888) is added to the numerical value of the first byte 351-1 (e.g., 148) to equal 38,036.

In the example shown in FIG. 3A, the bits are stored in accordance with a big endian bitwise format. As such, the bits of the element are not stored in bit-sequential order. For instance, the bits corresponding to sequence numbers 341 of "0" (e.g., the LSB of the 16-bit element) and "15" (e.g., the MSB of the 16-bit element) are not stored in adjacent cells. For example, as illustrated in FIG. 3A, the bit corresponding to sequence number "0" (which is a logic 0 in this example) is stored in cell 301-8 and the bit corresponding to sequence number "15" (which is a logic 1 in this example) is stored in adjacent cell 301-9. In the example shown in FIGS. 3A and 3B, a sequence number 341 of "0" indicates a least significant bit, a sequence number of "1" indicates a next more significant bit, and so forth until a sequence number of "15" indicates a most significant bit. In FIG. 3A, the bits within each byte 351-1 and/or 351-2 have a big endian order such that the LSB of byte 351-1 is stored in cell 301-8, the MSB of byte 351-1 is stored in cell 301-1, etc.

The sequence numbers 341 can correspond to an ordering of the bits in a controller (e.g., controller 140 shown in FIG. 1) which can be configured to order and/or reorder the bits in association with transferring data between memory (e.g., memory array 130) and a host (e.g., host 110), for example. For instance, the sequence numbers 341 can correspond to column numbers within a controller. As shown in FIG. 3A, the bits of the element stored in row 311-1 have corresponding sequence numbers "0" through "15" and are stored in the memory cells 301-1 to 301-16 in a bytewise little endian format. As such, in FIG. 3A, byte 351-1 (e.g., the byte comprising the eight least significant bits of the 16-bit element as indicated by corresponding sequence numbers "0" to "7") is stored in the left-most cells 301-1 to 301-8, and byte 351-2 (e.g., the byte comprising the eight most significant bits of the 16-bit element as indicated by corresponding sequence numbers "8" to "15") is stored in the right-most cells 301-9 to 301-16. In FIG. 3A, although the bits of the element stored in cells 301-1 to 301-16 are stored in a bytewise little endian format, the bits within each byte 351-1/351-2 are stored in a bitwise big endian format. For example, the bits within each byte 351-1/351-2 are stored such that the left-most address corresponding to the byte stores the most significant bit (e.g., uppermost sequence number 341) and the right-most address corresponding to the byte stores the least significant bit (e.g., lowermost sequence number 341). Hosts (e.g., processors) often send and receive data in a bytewise little endian format or in a bytewise big endian format. The data is often bitwise big endian regardless of the byte-endianness due to data being read byte by byte.

While the example of FIG. 3A shows the bits ordered from least significant to most significant or most significant to least significant (as in little endian or big endian format), bits may be ordered in a number of different ways depending on how the host (e.g., a processor) and/or a number of devices may have altered the order to perform a number of operations (e.g., perform a mathematical operation on the data, etc.). For example, bits maybe non-bit-sequential and be reordered to be bit-sequential in either big endian or little endian bytewise. It can be beneficial to order the bits (e.g., as stored in the memory) to be contiguous (e.g., in sequential number order) to facilitate performance of shift operations, for instance.

The format (e.g., sequence order) of the bits stored in memory can affect the efficiency associated with performing various operations (e.g., operations that may require shifting of bits), for example. For instance, in some memory architectures, such as that shown in FIG. 2, various logical and/or mathematical operations can be performed without transferring data (e.g., operands) out of the array (e.g., without transferring data to an ALU of a processor). Performing operations using some such architectures can include shifting of bits stored in the array. As such, storing bits corresponding to elements (e.g., operands) in bit sequential order in the array can provide benefits such as reducing the number of shifts required to perform a particular operation, for example. For example, if an operation performed on an element involves shifting each of the constituent bits one sequence number (e.g., one bit position) in a most significant bit direction (e.g., which may be right or left depending on the endianness of the data), then a single shift operation may be performed to accomplish the shift if the bits are stored sequentially, such as shown in FIG. 3B. In contrast, multiple shifts and/or other operations may be required to accomplish the shifting of each of the bits by one bit position if the bits are stored non-sequentially, such as shown in FIG. 3A. In response to a host using a different endianness format (e.g., little endian bytewise as illustrated in FIG. 3A), reordering of the bits can contiguously order the bits for performing a shift operation in memory. However, microcode (e.g., instructions provided to controller 140 in association with executing a program) including instruction to perform a shifting operation for a bytewise big endian, bitwise big endian format could not be used in the same way for performing a shifting operation on bits in a bytewise little endian, bitwise little endian format. Separate forms of code would be determined as each ordering has a different most significant bit direction. Providing for a single microcode that could be used for either big endian or little endian formats would reduce the amount of microcode used for shifting. A flag 172 in a controller (e.g., a sequencer) can indicate whether a host is operating in a big endian or little endian mode and/or whether data stored in a memory array is stored in a big endian or little endian format. As an example, the flag 172 can indicate whether the received data is in a format such as that shown in FIG. 3A (e.g., little endian bytewise and big endian bitwise such that the bits are non-sequential) or whether the received data is in a format such as that shown in FIG. 3D (e.g., big endian bytewise and big endian bitwise such that the bits are sequential). As described further herein, the controller (e.g., 140) can be configured to shift the bits in a particular direction in response to the status of the flag 172, which indicates the format of the data. For example, in order to shift the bits of an element left numerically (e.g., in a most significant bit direction), the direction of the shifting of the bits (in sequence number order) may be right or left, depending on the format of the data (e.g., depending on whether the MSB direction is right or left). As such, since the flag 172 indicates the format in which the data is stored, and thus the appropriate shift direction, the direction in which the controller is to shift the data can be determined by determining the status of the flag 172. As noted above, the status of the flag 172 can indicate the endianness format of the host (e.g., 110). The flag 172 can be stored in array 130, in controller 140, and/or in the host 110 and the status of the flag can be set at various times (e.g., during boot time of system 100, when the host 110 switches from one particular endianness mode to another, etc.). The endianness mode of the host 110 can be monitored by the controller 140, and or can be provided to the controller 140 by the host 110, for example.

FIG. 3B illustrates a schematic diagram of a portion of a memory array in accordance with a number of embodiments of the present disclosure. FIG. 3B illustrates reordering of bits and reversing of addresses responsive to the status of a flag 172. As an example, the flag 172 can be a hardware flag (e.g., a register flag) whose status (e.g., value) indicates the particular format of data being handled by a controller (e.g., data received from a host or from memory). As an example, a first status of the flag (e.g., a logic "1") can indicate the data is in a bytewise little endian, bitwise big endian format. For example, in response to a sequencer receiving data in a particular format, such as data illustrated in FIG. 3A, a hardware flag would be set. The set hardware flag indicates to reorder the bits in a bytewise fashion. For example, the bit corresponding to sequence number "7" in FIG. 3A (e.g., the bit stored in cell 301-1 in FIG. 3A) is reordered to be stored in cell 301-8, as illustrated in FIG. 3B. The bit corresponding to sequence number "0" (e.g., the bit stored in cell 301-8 in FIG. 3A, which is the LSB of byte 351-1 and of the 16-bit element stored in row 311-1) is reordered to be stored in cell 301-1, as illustrated in FIG. 3B. For example, as shown in FIG. 3B, the bits of byte 351-1 in FIG. 3A (e.g., bits [01001110] stored in respective cells 301-1 to 301-8) are reordered to be stored as [01110010] in respective cells 301-1 to 301-8. In response to the hardware flag being set, the bits (e.g., bits [10010100]) of byte 351-2 in FIG. 3A are reordered to [00101001] stored in cells 301-9 to 301-16 in FIG. 3B. Bits of each byte (e.g., bytes 351-1 and 351-2) are reordered on a bytewise basis such that the constituent bits of the element are bit-sequential (e.g., in sequence number order).

The reordering can be performed by a reordering engine (e.g., engine 170 in FIG. 1) that reorders the bits on a bytewise basis. In some examples, the reordering of data can be performed by I/O circuitry 144 and can be controlled by engine 170. In some examples, the reordering of data can be performed by an engine such as engine 170 and be performed somewhere along a data path between I/O circuitry 144 and controller 140 and/or along additional data paths illustrated in FIG. 1. Reversing an order of address bits can be performed by address circuitry 142 in FIG. 1 and/or column decode circuitry 152. For example, as the data is read to the controller 140 and/or written to the memory array 130 and/or an additional location not illustrated, the address bits associated with the data can have an order reversed while being transferred along the data path indicated by arrows in FIG. 1.

The reordering on a bytewise basis can be performed such that the total number of bytes in an element does not need to be determined before reordering the bits of the element. For example, when receiving bits of the 16-bit element of row 311-1, the reordering engine may not know there are two (2) bytes in the element and can process the bits to a bit-sequential little endian format without knowing the number of bytes of the element. As the reordering engine receives the first eight (8) bits (e.g., bits ordered as [01001110] for the first byte 351-1), the reordering engine reorders the bits to be in a reversed order (e.g., to bits ordered as [01110010] corresponding to sequence numbers 341 of "0" to "7", as illustrated in FIG. 3B). As the reordering engine receives the second byte (e.g., byte 351-2 including bits ordered as [10010100]), the reordering engine reverses the bits to be ordered as [00101001] (corresponding to sequence numbers "8" 341-8 through "15" 341-15, as illustrated in FIG. 3B). Since the reordering engine can reorder on a bytewise basis, the reordering engine will continue until the element has been received (without knowing how many total bytes when it starts reordering). However, embodiments are not so limited. A number of elements can be received (beyond the 16-bit element example) and the reordering engine can continue to reorder bits for a number of elements as the number of elements are received.

Addresses corresponding to each bit of a number of bits (e.g., bits stored in cells 301-1 to 301-16) are reordered (e.g., reversed and/or inverted) when a hardware flag is set. For example, sequence number "7" 341-7 that corresponds to cell 301-1 in FIG. 3A is reordered to correspond to cell 301-8, as illustrated in FIG. 3B. Sequence number 341 "0" that corresponds to cell 301-8 in FIG. 3A is reordered to correspond to cell 301-1, as illustrated in FIG. 3B. Each of the sequence numbers ordered as 7, 6, 5, 4, 3, 2, 1, and 0 in the first byte 351-1, as illustrated in FIG. 3A, are reordered to 0, 1, 2, 3, 4, 5, 6, and 7, as illustrated in FIG. 3B. Likewise, each of the sequence numbers ordered as 15, 14, 13, 12, 11, 10, 9, and 8 in the second byte 351-2, as illustrated in FIG. 3A, are reordered to 8, 9, 10, 11, 12, 13, 14, 15, as illustrated in FIG. 3B. The reordering of the bits and the addresses corresponding to the bits provides contiguous sequence numbers to be shifted when performing a number of shift operations. For example, reordering of the bits orders the bits from sequence number 341 of "0" to sequence number 341 of "15", as illustrated in FIG. 3B, rather than from a sequence number 341 of "7" to "0" in the first byte 351-1 and from a sequence number 341 of "15" to "8" in FIG. 3A.

FIG. 3C illustrates a schematic diagram of a portion of a memory array in accordance with a number of embodiments of the present disclosure. The element stored in FIG. 3C illustrates an example of shifting responsive to a hardware flag being set. The hardware flag is set responsive to receiving bits in a particular endianness format (e.g., in a little endian bytewise, big endian bitwise format). The direction of a shift of the bits in the memory array is based on whether the hardware flag is set or not set. Shifting that occurs in a most significant bit direction would result in shifting the bits from a lesser significant bit (e.g., the bit stored in cell 301-1 in FIG. 3C) toward a more significant bit (e.g., toward a bit stored in cell 301-2). When the bits are reordered (as they are from FIG. 3A to FIG. 3B), the shifting direction is changed responsive to the flag being set. The bit stored in cell 301-1 in FIG. 3B is shifted to the right (toward a more significant bit) when the hardware flag is set. For example, the bit stored in cell 301-1 (e.g., bit "0") in FIG. 3B is shifted to be stored in cell 301-2, as illustrated in FIG. 3C. The element stored in FIG. 3B as ordered bits [0111001000101001] is shifted one position to the right to result in ordered bits [0011100100010100] stored in corresponding cells 301-1 to 301-16.

While the example shows an element stored in a row of memory cells (e.g., row 311-1 in FIG. 3A), embodiments are not so limited. For example, the element can be stored vertically and reordered vertically in a similar way as the horizontal reordering. Likewise, bits stored vertically that would be shifted upward when a hardware flag is not set would be shifted downward when the hardware flag is set, and vice versa.

FIG. 3D illustrates a schematic diagram of a portion of a memory array in accordance with a number of embodiments of the present disclosure. FIG. 3D illustrates an example of a number of bits that are stored in a bytewise big endian, bitwise big endian format in a number of memory cells. For example, a most significant byte is stored in a left-most address and a least significant bit is stored in a right-most address. The most significant byte 351-2 includes a first bit (e.g., "1") stored in cell 301-1 that has a sequence number of "15" 341-15, indicating that the first bit is a most significant bit of the element stored in cells 301-1 to 301-16. The most significant byte 351-2 includes bits with sequence numbers "15" 341-15 through "8" 341-8. The least significant byte 351-1 includes bits with sequence numbers "7" 341-7 through "0" 341-0, as illustrated in FIG. 3D. The bytes are in a big endian format (e.g., most significant byte to least significant byte) and the bits are also in a big endian format (e.g., most significant bit to least significant bit). In this example, the bytewise and bitwise big endian format would not set the hardware flag. Therefore, the bits stored in a big endian format in FIG. 3D would not be reordered and the addresses associated with the bits would not be reversed.

In the example of FIG. 3D, a shifting direction of a number of shift operations performed on the bits stored in cells 301-1 through 301-16 would remain to the left (e.g., toward a most significant bit) when the flag indicates a big endian bytewise, big endian bitwise format. For example, shifts toward a most significant bit direction (e.g., leftward in the example shown in FIG. 3D) would still occur in the same direction (e.g., leftward).

FIG. 3E illustrates a schematic diagram of a portion of a memory array in accordance with a number of embodiments of the present. FIG. 3E illustrates a shifting of bits (e.g., bits stored in cells 301-1 to 301-16 of FIG. 3D) where the hardware flag is not set. For example, the bits (e.g., [1001010001001110]) stored in cells 301-1 to 301-16 can be shifted one position to the left toward a most significant bit direction. For example, the bit stored in cell 301-2 (e.g., bit "0") in FIG. 3D would be shifted one position to the left and be stored in cell 301-1, as illustrated in FIG. 3E. Likewise, the bit stored in cell 301-16 (e.g., bit "0") in FIG. 3E would be shifted left one position to be stored in cell 301-15, as illustrated in FIG. 3E. Therefore, the bits ordered as [1001010001001110] would be shifted left one position to store bits [0010100010011100].

Data can be sent from the memory array back to the sequencer after a number of operations are performed. When the hardware flag indicates (e.g., is set to indicate) that data is in a particular format (e.g., little endian bytewise, big endian bitwise) used by the host, the data can be returned to an original ordering (e.g., returned to little endian bytewise, big endian bitwise format) when returned to the host. For example, data in a little endian format (such as the data in FIG. 3A) that has been reordered (such as the reordered data in FIG. 3B) and altered based on a number of operations performed (such as the right shift illustrated in FIG. 3C) on the data, the data can be returned to a little endian format. The data can be returned to the little endian format by reversing the bits on a bytewise basis. The reversed bits can be returned to a host and/or other external data source.

While the examples given show a shifting in a most significant bit direction when a flag is set (e.g., indicates a particular endianness), embodiments are not so limited. The hardware flag is set to indicate to change a direction of the shifting regardless of the original shifting direction. A number of shift operations may include shifting toward a least significant bit direction. For example, for example, if performing a shift operation of shifting toward a least significant bit direction includes shifting to the left, a set hardware flag would indicate to change the direction to the right. If the hardware flag is not set, the shift would occur to the left. And vice versa, if performing a shift operation of shifting toward a least significant bit direction includes shifting to the right, a set hardware flag would change the direction to the left. If the hardware flag is not set, the shift would occur to the right.

While the examples given include reordering bits from a non-bit-sequential little endian format to a bit-sequential little endian format, embodiments are not so limited. As bits may not be ordered sequentially even in bitwise big-endian formats, bits in a non-bit-sequential big endian format can be reordered to be bit-sequential (e.g., contiguous) in order to perform a number of operations (e.g., shift operations) on the bits. While a host's native endianness can be little endian or big endian, either format (little endian or big endian) can be used by the host after reordering. For example, a host can have little endian as the host's native endianness and use reordering of the bits to support big endian operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving a plurality of bytes in a particular endianness format based on a status of a flag indicating an endianness of a plurality of bytes; and
   responsive to the particular endianness format being a first endianness format:
      reordering bits of each byte of the plurality of bytes on a bytewise basis;
      storing the reordered plurality of bytes in an array of memory cells; and
      adjusting a shift direction associated with performing a number of operations on the plurality of bytes stored in the array;
   reversing an order of row addresses received from a sequencer when bytes are stored in rows and reversing an order of column addresses received from the sequencer when bytes are stored in columns; and
   responsive to the particular endianness format being a second endianness format, storing the plurality of bytes in the array without reordering bits of the plurality of bytes.

2. The method of claim 1, wherein determining whether the particular endianness format is the first endianness format or the second endianness format comprises determining a state of a flag.

3. The method of claim 2, further comprising receiving the plurality of bytes from a host and setting the state of the flag based on an endianness corresponding to the host.

4. The method of claim 1, wherein storing the reordered plurality of bytes comprises storing the reordered plurality of bytes so as to be bit-contiguous.

5. The method of claim 1, wherein the first endianness format is a little endian format.

6. The method of claim 1, wherein reordering the bits in each byte of the plurality of bytes comprises ordering bits of each byte from a bitwise big endian format to a bitwise little endian format.

7. The method of claim 1, comprising performing a number of shift operations on the bits in each byte of the plurality of bytes.

8. The method of claim 7, wherein the bits are shifted in a more significant bit direction.

9. The method of claim 7, wherein the bits in each byte of the plurality of bytes are shifted:
   in a rightward direction when the plurality of bytes are in the first endianness format; and
   in a leftward direction when the plurality of bytes are in a second endianness format.

10. The method of claim 7, wherein:
    each of the bits is stored in one of a respective number of compute components; and
    performing the number of shift operations comprises shifting each of the number of bits from a compute component coupled to a memory cell storing a lesser significant bit to a compute component coupled to a memory cell storing a more significant bit.

11. The method of claim 1, wherein the plurality of bytes are stored in cells coupled to a corresponding one of a plurality of access lines of the array.

12. The method of claim 1, wherein, in response to receiving the bits in the second endianness format, the bits remain in the second endianness format.

13. The method of claim 12, wherein a flag is not set when the bits are received in a big endian format.

14. The method of claim 1, comprising sending the reordered bits to a controller.

15. The method of claim 1, wherein reordering the bits of each byte of the plurality of bytes comprises reordering a most significant bit of a first byte from a most significant bit position to a least significant bit position.

16. The method of claim 15, wherein reversing the order of bits on a bytewise basis to the bit-sequential format comprises reordering a least significant bit of the first byte from a least significant bit position to the most significant bit position.

17. A method, comprising:
    determining a status of a flag indicating an endianness of a plurality of bytes;
    in response to a flag being set, indicating the plurality of bytes is received in a first endianness format:
      changing from shifting left to shifting right when the bits are stored in rows for shifting operations performed in an array of memory cells;
      changing from shifting up to shifting down when the bits are stored in columns for shifting operations performed in an array of memory cells;
      on a bytewise basis, reversing, via a controller, an order of bits of the plurality of bytes stored in a group of memory cells;
      reversing an order of addresses on a bytewise basis; and
      providing the bits with the reversed order and the corresponding addresses with reversed order to a host; and
    in response to the flag not being set based on the plurality of bytes being received in a second endianness format:
      providing the bits of the plurality of bytes stored in the group of memory cells to the host.

18. The method of claim 17, wherein the first endianness format is a bytewise little endian format.

19. The method of claim 17, wherein the second endianness format is a bytewise big endian format.

20. The method of claim 17, wherein the direction of shifting operations is toward a most significant bit direction when performing the shifting operations.

21. The method of claim 17, wherein:
    when the flag is set, the shifting operations are performed in a rightward direction; and
    when the flag is not set, the shifting operations are performed in a leftward direction.

22. An apparatus comprising:
    a controller coupled to an array of memory cells, wherein the controller is configured to:
    receive bits of a plurality of bytes, wherein:
      when the bits are in a first endian format a flag is set; and
      when the bits are in a second endian format the flag is not set;
    reorder the received bits when the flag is set from the first endian format to the second endian format by reversing the bits in each byte as each byte is received; and
    reverse an order of the row addresses associated with the plurality of bytes when bytes are stored in rows and the flag is set; and
    reverse an order of the column addresses associated with the plurality of bytes when bytes are stored in columns and the flag is set.

23. The apparatus of claim 22, wherein the bits are received from a host and sent to the array.

24. The apparatus of claim 22, wherein the array receives the bits and stores the bits:
    independent of altering an ordering of the bits and addresses associated with the bits when the flag is not set; and
    after the reordering of the bits and reversing an order of the addresses when the flag is set.

25. The apparatus of claim 22, comprising an array of memory cells configured to perform a number of shift operations in a particular direction based on whether the flag is set.

26. The apparatus of claim 22, wherein the array performs a number of operations independent of knowing which endianness format a host in communication with the array uses.

27. An apparatus comprising:
    a controller comprising an engine and configured to:
    receive bits of bytes in a particular endianness format;
    determine whether a flag is set, wherein the flag is set when the particular endianness format is a first endianness format and the flag is not set when the particular endianness format is a second endianness format;
    when the flag is set:
      cause the engine to reorder the received bits in the bytewise little endian format to a bit-sequential little endian format by reversing the bits bytewise;
      reverse an order of row addresses associated with the bits received from a sequencer when bytes are stored in rows and reversing an order of column addresses associated with the bits received from the sequencer when bytes are stored in columns; and
      store the bits in a group of memory cells of an array; and an array of memory cells comprising the group of memory cells and configured to perform a number of shift operations on the bits.

28. The apparatus of claim 27, wherein the first endianness format is a bytewise little endian format and the second endianness format is a bytewise big endian format.

29. The apparatus of claim 27, wherein the array configured to perform the number of shift operations comprises the array configured to perform the number of shift operations in a first direction when the flag is not set and in a second direction when the flag is set.

* * * * *